United States Patent [19]

Moriyama et al.

[11] 3,756,491
[45] Sept. 4, 1973

[54] DEVICE FOR INTERMITTENTLY DRIVING A FILM

[75] Inventors: Inao Moriyama, Sagamihara; Tomoshi Takigawa, Tokyo; Hiroya Shibuya, Kawasaki, all of Japan

[73] Assignee: Canon Kabushiki Kaisha

[22] Filed: Aug. 5, 1971

[21] Appl. No.: 169,402

[30] Foreign Application Priority Data
Aug. 7, 1970  Japan....... 45/78562 (utility model)
Aug. 7, 1970  Japan....... 45/78564 (utility model)

[52] U.S. Cl........................ 226/67, 226/70, 352/194
[51] Int. Cl. ............................................. G03b 1/22
[58] Field of Search .................. 226/59, 60, 64, 67, 226/70; 352/191, 194

[56] References Cited
UNITED STATES PATENTS
3,212,840  10/1965  Roman et al. ..................... 226/64 X
3,463,373  8/1969  Johnson et al. .................... 226/60 X Primary Examiner—Allen N. Knowles
Assistant Examiner—Gene A. Church
Attorney—David Toren et al.

[57] ABSTRACT

In a device for intermittently driving a film having means for intermittently driving the film while a driving claw is in engagement with a perforation of the film, and means for restoring the claw from a position of completion of the driving to a position of start of the film driving, and for permitting the film to be maintained at a static state while the driving claw is disengaged with the perforation, improvements comprising an auxiliary means for restricting the driving claw, positioned in a position to restrict an impulsive action of the driving claw at least when the driving claw is engaged or disengaged with the perforation of the film in order to prevent the impulsive action of the driving claw.

8 Claims, 3 Drawing Figures

DEVICE FOR INTERMITTENTLY DRIVING A FILM

The present invention relates to a device for intermittently driving a film and concerns with improvements in such a driving device for a cinematographic camera or a projector and so on, which comprises intermittently driving the film by a driving means while a driving claw is in engagement with a perforation of the film, restoring the claw by the driving means from a position of completion of the driving to a position of start of the driving and permitting the film to be maintained at a static state, while the claw is disengaged with the perforation.

In conventional devices for a cinematographic camera, a projector and so on, the film driving is effected by engaging and disengaging the engaging portion of a driving claw with a perforation on a film while the driving claw is moved along a rectangular path; moved in a direction substantially longitudinal to the film moving direction and in a direction substantially vertical to the film plane, and the driving claw is normally biased by a spring in a direction of departing from the film to contact the claw with an end cam for driving. Such conventional devices, however, have defects that the driving claw is engaged excessively and irregularly (Je) and disengaged in a jumping manner (Jd) with the perforation very often during its movement as shown in FIG. 3 by a chained line so that a normal path shown in FIG. 3 by a full line M is attained, thus causing irregular film driving.

Irregularlity in the film driving increases at a higher driving speed namely at a higher rate of frames per seconds.

The present invention has overcome the above defects, particularly by providing an auxiliary means for restricting the driving claw so that the auxiliary means may be positioned in a position to restrict the jumping phenomena of the driving claw to maintain the driving claw in a normal state of operation together with an end cam at least when the driving claw is engaged or disengaged with the perforation of the film in order to prevent the jumping phenomena of the driving claw due to variation in acceleration of the driving claw.

The present invention has further overcome the above defects, particularly by positioning a point of application of a resilient force for biasing or retreating the driving claw and a point of application of a restrictive force for restricting or driving the driving claw on one line substantially rectangular to the film driving direction so that the driving claw may be maintained in a stable state of operation together with an end cam for restricting or driving the claw at a position where an auxiliary resilient means for restricting the driving claw prevents the swinging phenomena of the driving claw.

The present invention will be described by referring to the attached drawings.

Figure 1:
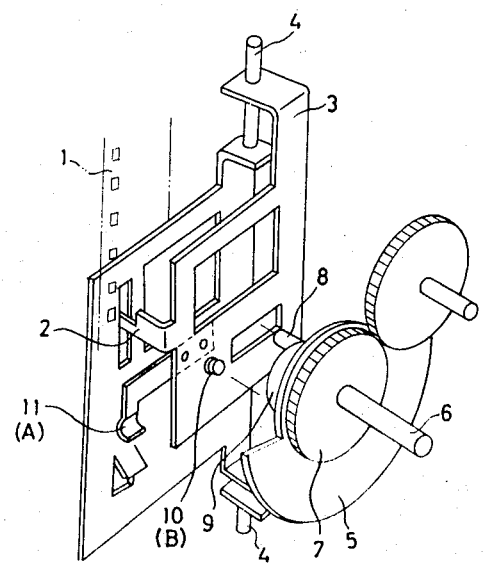
FIG. 1 is a perspective view showing a construction of one embodiment of the present invention.
Figure 3:
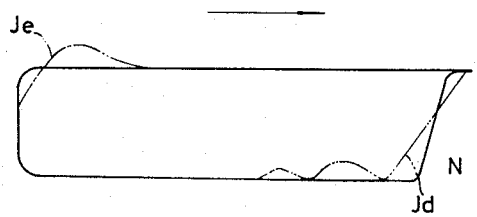
FIG. 3 illustrates the movement of the driving claw in the present inventive device in comparison with that in a conventional device.
Figure 2:
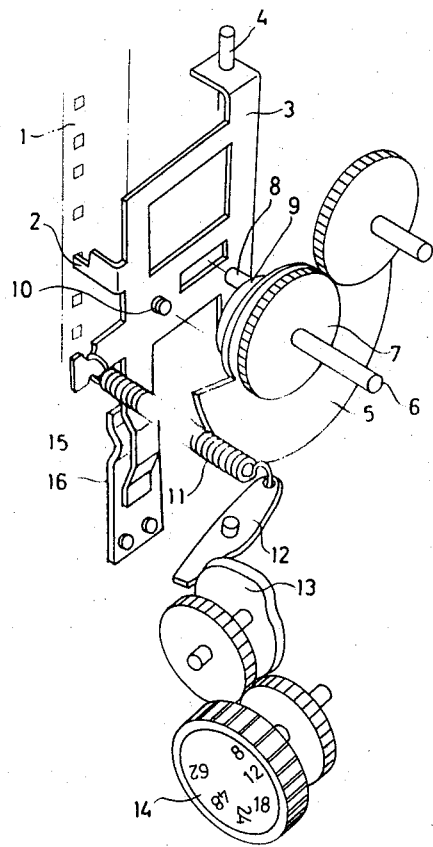
FIG. 2 is a perspective view showing a construction of a modified embodiment of the present invention.

In FIGS. 1 and 2, 1 is a film, 2 is a driving claw for driving the film, 3 is a frame for supporting the driving claw 2, 4 is a journal for supporting slidably and slightly rotatably the frame 3, 5 is a rotary sector for a shutter, 6 is a sector supporting shaft, 7 is a sector driving gear, 8 is an eccentrically arranged pin or cam which rotates together with the sector supporting shaft 6 and drives the driving claw up and down through a pin-slot engagement with the frame 3, 9 is an end cam which rotates together with the sector driving shaft 6 and gives a slight swinging movement in back and forth directions to the driving claw 2 by contact with a projection 10 of the frame 3, 11 is a spring fixedly provided to the frame 3 in such a manner that it makes the projection 10 normally contact the end cam 9 and gives the driving claw the tendency of normally departing from the film. A point A of application of the stored force of the spring and a point B of application of restricting or driving the driving claw slightly swingingly, namely the position of the projection 10 on the frame 3 are positioned on one line perpendicular to the film driving direction so that the vibration phenomena of the claw due to the twisting movement of the frame 3 is prevented. Regarding the position of the driving claw 2 relative to the pin 8 considerations are also given to minimize the irregular vibration of the claw 2.

Even with the above arrangement, it is very difficult to prevent the jumping phenomena of the driving claw in practice. Therefore, in order to prevent perfectly the jumping phenomena a pin-slot engagement or restriction without clearance may be applied for the slight swinging movement or the back and forth movement of the frame 3 as in case of the pin-slot engagement for the up and down movement of the frame 3. However, in this case the impulsive action and reaction due to variation in moving velocity of each element becomes too large, thus prohibiting practical application of the above arrangements.

Instead of the above arrangements, the auxiliary means for restricting the driving claw 2 is positioned in an operative position at a position to restrict the jumping phenomena of the frame 3 at least when the driving claw is engaged or disengaged with the perforation of the film 1 in order to prevent the jumping phenomena of the driving claw 2 due to variation in acceleration of the driving claw 2.

The restricting means causes an increase of resilient force at a position at which the jumping phenomena tends to take place as shown in FIGS. 1 and 2.

The positioning of the restricting means is relative so that a construction in which a means for varying the spring constant or stiffness of the spring 11 absorbs the jumping phenomena at the position at which the projection of the frame 3 is impulsively contacted as shown in FIG. 1, or a construction in which the auxiliary restricting means is composed of a relief portion 15 of the frame 3 and a leaf spring 16 as shown in FIG. 2 and so on. In case of FIG. 1, the restricting means is shown to be always in operation, but only the auxiliary restricting means may be in engagement only at the time of prevention of the jumping phenomena (Jd). In case of FIG. 2, both the excessive and irregular engagement (Je) at the time of engagement of the claw and the jumping phenomena (Ja) at the time of disengagement of the claw are avoided.

Particularly in FIG. 2, one end of the spring 11 is connected with a lever 12, and a cam 13 contacting the lever 12 is arranged to be rotated by disc for setting a rate of frames per second of the film driving, and thereby the tension of the spring 11 is increased by rotating the lever 12 with the aid of the cam 13 in case of increasing the rate of frames per second of the film driving by the setting operation of the disc 14, while the tension of the spring 11 is decreased in case of decreasing the rate of frames per second.

As the present invention is constructed as described above, the jumping phenomena and/or excessive engagement or irregularlity are effectively and assuredly prevented at a relatively low cost with only a slight but substantial modification to the conventional device. This is very effective particularly in case of changing over of the film driving speed at photographing or projecting in case of a high speed film driving with practical advantages that excessive increase of driving power is not required and appropriate selection of strength of materials can be made for each components and further the frame may be reduced in its strength for attaining a stable driving very effectively.

What is claimed is:

1. In a device for intermittently driving film containing perforations, the combination comprising: a film-driving claw engageable with and disengageable from the perforations of the film; carrying means supporting said film-driving claw and operable to move said claw through a normal operating cycle for intermittently transporting a predetermined length of the film; means for swingingly driving said carrying means in a direction substantially perpendicular to the direction of film transport in order to engage and disengage said driving claw from the film perforations; and auxiliary means for restricting the action of said film-driving claw to prevent an irregular action during the normal operating cycle, said auxiliary means including a movable member engageable with said carrying means supporting said film-driving claw and a stationary member arranged in engagement with said movable member for normally biasing said movable member in a direction away from the film during the normal operating cycle of said claw, said movable member is a spring member, said stationary member having a planor portion engageable with said movable member when the claw is in engagement with the perforation in the film and a projected portion contiguous to said planor portion and extending toward said movable member and said projected portion being engageable with said movable member when said claw disengages from the perforation in the film for exerting a force larger than the force upon said carrying means in a direction perpendicular to the direction of film transport for restricting the swinging movement of said carrying means to prevent an irregular action of said claw when it disengages from the perforation of the film.

2. A device according to claim 1 wherein said means for driving said carrying means include rotatable means engageable with said carrying means.

3. A device according to claim 2 wherein said rotatable means further comprise an end cam and an eccentrically arranged member mounted thereon engaging said carrying means.

4. A device according to claim 3, wherein said carrying means comprise a projection member engageable with said end cam and an opening engageable with said eccentrically arranged member.

5. A device according to claim 1, wherein said carrying means further comprise biasing means normally pressing said carrying means against said driving means.

6. A device according to claim 1, wherein said movable member of said auxilliary means is engageable with said stationary member when said film driving claw comes into a position engaging a perforation of said film, said auxilliary means being arranged to exert a force upon said carrying means in a direction perpendicular to the direction of film transport for restricting the swinging movement of said carrying means thereby to prevent irregular action of said claw when it comes into engagement with a perforation of the film.

7. In a device for intermittently driving film containing perforations, the combination comprising: a film-driving claw engageable with and disengageable from the perforations of the film; carrying means supporting said film driving claw and operable to move said claw through a normal operating cycle to intermittently transport a predetermined length of said film; means for swingingly driving said carrying means in a direction substantially perpendicular to the direction of film transport in order to engage and disengage said driving claw from said film perforations; and auxiliary means for restricting the action of said film-driving claw during said normal operating cycle, said auxiliary means including a stationary member and a movable member engageable with said stationary member at least during the portion of said claw operating cycle when said claw is disengaging from a perforation of the film, said auxiliary means being arranged to exert a force upon said carrying means in a direction perpendicular to the direction of film transport thereby restricting the swinging movement of said carrying means to prevent irregular action of said claw when it disengages from the perforation of the film biasing means normally pressing said carrying means against said driving means, said biasing means comprise a resilient member applying a variable resilient force against said carrying means, and means for determining said resilient force in accordance with the driving speed of said film.

8. A device according to claim 7 where in said biasing means further comprise a film driving speed setting means.

* * * * *